United States Patent
Baxter

(10) Patent No.: US 10,443,838 B2
(45) Date of Patent: Oct. 15, 2019

(54) METHOD FOR FORMING CONSISTENTLY-SIZED AND CONTROLLABLY-TIMED DROPLETS

(71) Applicant: Larry Baxter, Orem, UT (US)

(72) Inventor: Larry Baxter, Orem, UT (US)

(73) Assignee: Hall Labs LLC, Provo, UT (US)

( * ) Notice: Subject to any disclaimer, the term of this patent is extended or adjusted under 35 U.S.C. 154(b) by 148 days.

(21) Appl. No.: 15/479,471

(22) Filed: Apr. 5, 2017

(65) Prior Publication Data

US 2018/0290154 A1    Oct. 11, 2018

(51) Int. Cl.

| | | |
|---|---|---|
| B05B 1/02 | (2006.01) | |
| B05B 7/00 | (2006.01) | |
| F23D 11/44 | (2006.01) | |
| F23K 5/22 | (2006.01) | |
| F23D 3/08 | (2006.01) | |
| B01D 53/50 | (2006.01) | |
| B01D 53/62 | (2006.01) | |
| B01D 53/79 | (2006.01) | |

(52) U.S. Cl.
CPC ............ *F23D 11/44* (2013.01); *B01D 53/504* (2013.01); *B01D 53/62* (2013.01); *B01D 53/79* (2013.01); *F23D 3/08* (2013.01); *F23K 5/22* (2013.01); *B01D 2257/302* (2013.01); *B01D 2257/304* (2013.01); *B01D 2257/404* (2013.01); *B01D 2257/504* (2013.01); *B01D 2259/124* (2013.01); *B05B 1/02* (2013.01); *B05B 7/00* (2013.01)

(58) Field of Classification Search
CPC ................................ B05B 1/02; B05B 7/0075
USPC ........................................................ 431/12
See application file for complete search history.

(56) References Cited

U.S. PATENT DOCUMENTS

| 4,628,040 | A | * | 12/1986 | Green | B01J 2/08 502/8 |
|---|---|---|---|---|---|
| 5,041,585 | A | * | 8/1991 | Deavenport | C07F 5/068 526/160 |
| 5,521,079 | A | * | 5/1996 | Dorian | A01N 1/02 264/4.7 |
| 5,962,606 | A | * | 10/1999 | Williams | B01J 8/0015 502/155 |
| 6,119,953 | A | * | 9/2000 | Ganan-Calvo | B05B 7/0475 222/420 |
| 6,133,044 | A | * | 10/2000 | Van den Engh | G01N 15/1404 209/3.1 |
| 6,405,936 | B1 | * | 6/2002 | Ganan-Calvo | A61M 15/0065 239/371 |
| 6,450,189 | B1 | * | 9/2002 | Ganan-Calvo | B05B 7/065 137/12 |

(Continued)

*Primary Examiner* — Gregory L Huson
*Assistant Examiner* — Nikhul P Mashruwala

(57) ABSTRACT

A method for forming substantially consistently-sized and substantially controllably-timed droplets is disclosed. An opening is provided through which a protrusion passes. The protrusion ends at a tip below the opening. A process liquid is provided to the opening at a controlled flow rate. The process liquid passes through the opening and flows along the protrusion, forming a droplet of the process liquid on the tip that reaches a substantially consistent droplet size and falls. The process liquid continues to pass through the opening at an even time interval based on the flow rate. In this manner, substantially consistently-sized and substantially controllably-timed droplets are formed.

20 Claims, 13 Drawing Sheets

(56) References Cited

U.S. PATENT DOCUMENTS

| | | | | |
|---|---|---|---|---|
| 6,537,505 B1* | 3/2003 | Labudde | ............. | F16K 31/0651 |
| | | | | 222/504 |
| 6,595,202 B2* | 7/2003 | Ganan-Calvo | ........ | B05B 7/0884 |
| | | | | 128/200.14 |
| 6,792,940 B2* | 9/2004 | Ganan-Calvo | .... | A61M 15/0065 |
| | | | | 128/200.14 |
| 2006/0101665 A1* | 5/2006 | Carin | .................... | F26B 19/005 |
| | | | | 34/513 |
| 2006/0197789 A1* | 9/2006 | Kusunoki | ............ | B41J 2/04525 |
| | | | | 347/10 |
| 2015/0231967 A1* | 8/2015 | Topolovec | ............. | B60K 15/04 |
| | | | | 220/86.2 |
| 2018/0029054 A1* | 2/2018 | Jiang | .................... | F23D 11/007 |
| 2019/0093967 A1* | 3/2019 | Baxter | .................... | B01D 1/16 |

* cited by examiner

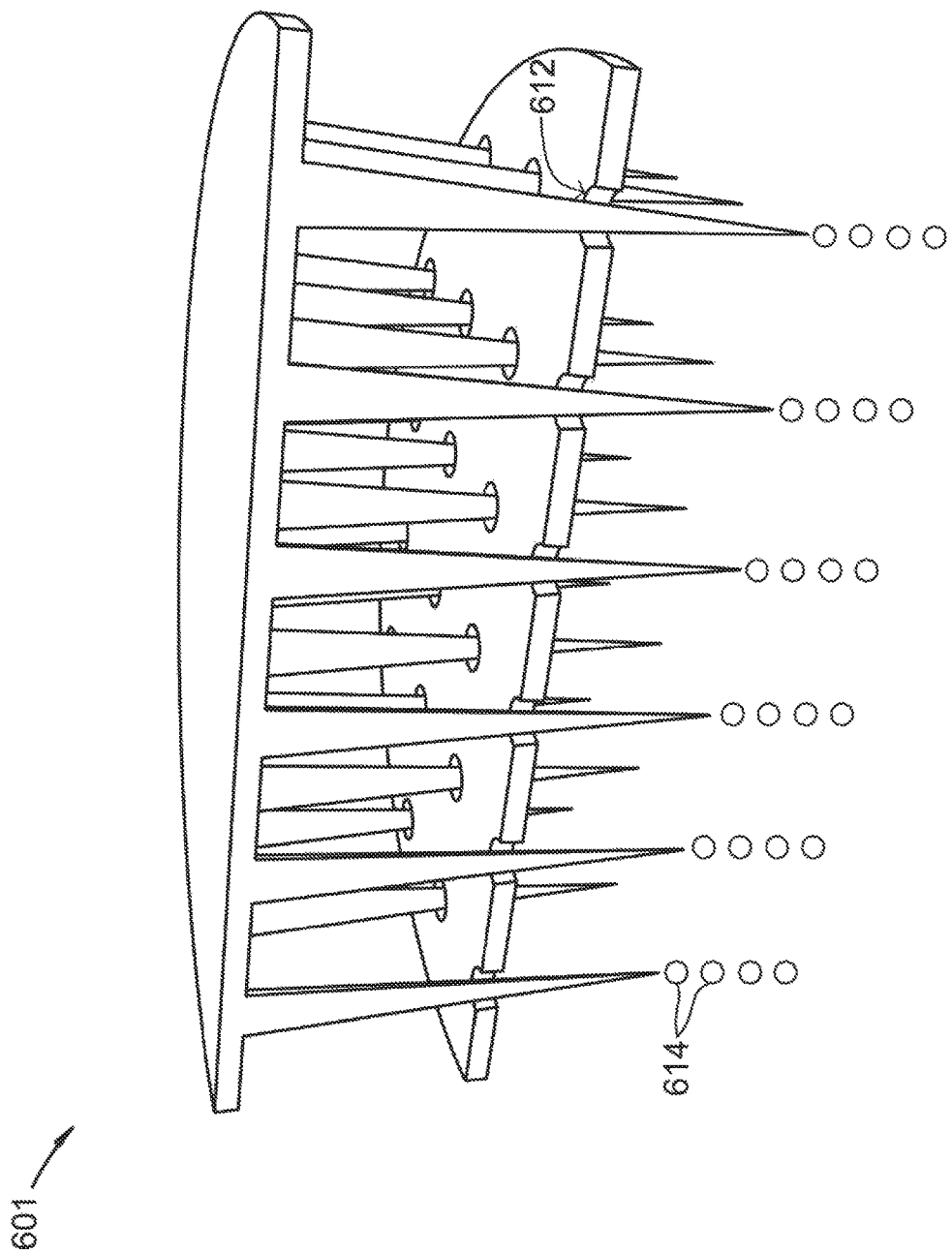

METHOD FOR FORMING CONSISTENTLY-SIZED AND CONTROLLABLY-TIMED DROPLETS

This invention was made with government support under DE-FE0028697 awarded by The Department of Energy. The government has certain rights in the invention.

FIELD OF THE INVENTION

This invention relates generally to the field of droplet formation. More particularly, we are interested in the formation of substantially consistently-sized and substantially controllably-timed droplets.

BACKGROUND

The art of droplet formation is of critical importance in many industries. For example, droplets are formed in spray towers, absorption towers, and combustors. Some of these cases prefer uniform size droplets. Many droplet formation systems produce a broad range of size. The ability to make droplets of even size, consistently, is needed.

"Single Droplet Combustion of Biomass Pyrolysis Oils," a study by Sandia National Laboratories and published in *Energy & Fuels,* 1994, 8, 1131-1142 by Green, et al., teaches droplet generators utilizing capillary tubes fed by syringe pumps to produce controllably-sized and distributed droplets, torn away from the capillary tube by the drag force of a coaxial gas flow. The present disclosure differs in that syringe pumps and delicate capillary tubes are not required, a cooling jacket was required, and no protrusions were used. This disclosure is pertinent and may benefit from the methods disclosed herein and is hereby incorporated for reference in its entirety for all that it teaches.

U.S. Pat. No. 6,133,044, to van den Engh teaches a high speed flow cytometer droplet formation system and method. The cytometer utilizes an oscillator or piezoelectric crystal unidirectionally coupled to the sheath fluid to form droplets from the fluid jet. The present disclosure differs from this disclosure in that droplet formation requires an oscillator or piezoelectric crystal to form droplets dispensed from a nozzle. This disclosure is pertinent and may benefit from the methods disclosed herein and is hereby incorporated for reference in its entirety for all that it teaches.

U.S. Pat. No. 5,962,606, to Williams, et al., teaches control of solution catalyst droplet size with an effervescent spray nozzle. The effervescent spray nozzle produces fine catalyst droplet dispersion, resulting in small spherical primary particles and small agglomerates. The present disclosure differs from this disclosure in that a nozzle is used for droplet formation, the droplets are not of consistent size or produced in an controllably-timed manner. This disclosure is pertinent and may benefit from the methods disclosed herein and is hereby incorporated for reference in its entirety for all that it teaches.

U.S. Pat. No. 4,666,673A, to Timm, teaches an apparatus for preparing large quantities of uniform drop size. The apparatus produces spheroidal polymer beads by a combination of uniform openings and a vibratory exciter parallel to the axis of the monomer jet. The present disclosure differs from this disclosure in that the openings do not have a protrusion, and a vibratory exciter is required. This disclosure is pertinent and may benefit from the methods disclosed herein and is hereby incorporated for reference in its entirety for all that it teaches.

U.S. Pat. No. 6,464,886, to Gañan-Cálvo, teaches a device and method for creating spherical particles of uniform size. A stream of gas is forced through a liquid held under pressure in a pressure chamber, then exits with the liquid out of an orifice, creating a monodispersion of bubbles of substantially uniform size. The system can also produce bubbles. The present disclosure differs from this disclosure in that a gas stream is required to make the spherical particles, an orifice is required, and the liquid spheres produced are aerosols, not drops. This disclosure is pertinent and may benefit from the methods disclosed herein and is hereby incorporated for reference in its entirety for all that it teaches.

U.S. Pat. No. 6,029,896, to Self, et al., teaches a method of drop size modulation with extended transition time waveform. The waveform used allows the droplet volume dispensed from a demand mode inkjet type device to be increased and selected according to certain parameters. The present disclosure differs from this disclosure in that the droplets are formed through an orifice and are sized by a waveform produced by a piezoelectric or similar. This disclosure is pertinent and may benefit from the methods disclosed herein and is hereby incorporated for reference in its entirety for all that it teaches.

SUMMARY

A method for forming substantially consistently-sized and substantially controllably-timed droplets is disclosed. An opening is provided through which a protrusion passes. The protrusion ends at a tip below the opening. A process liquid is provided to the opening at a controlled flow rate. The process liquid passes through the opening and flows along the protrusion, forming a droplet of the process liquid on the tip that reaches a substantially consistent droplet size and falls. The process liquid continues to pass through the opening at an even time interval based on the flow rate. In this manner, substantially consistently-sized and substantially controllably-timed droplets are formed.

The process liquid may comprise an entrained solid.

The protrusion may comprise a surface material that inhibits adsorption of gases, prevents deposition of solids, or a combination thereof. The protrusion may be attached to a plate suspended above the opening. The protrusion may be attached to an interior side of the opening.

The method may be used for forming droplets in a system comprising spray towers, absorption towers, combustors, prilling towers, and combinations thereof.

The tip of the protrusion may comprise a diameter smaller than the substantially consistent-droplet size.

The opening may be axially oriented inside a tube, the tube extending below a bottom portion of the opening and above the tip of the protrusion. The tube provides a gas flowing axially downward past the droplets to draw the droplets off the protrusion.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 6A-B shows a cross-sectional view and an isometric cutaway view of a device for forming substantially consistently-sized and substantially controllably-timed droplets.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
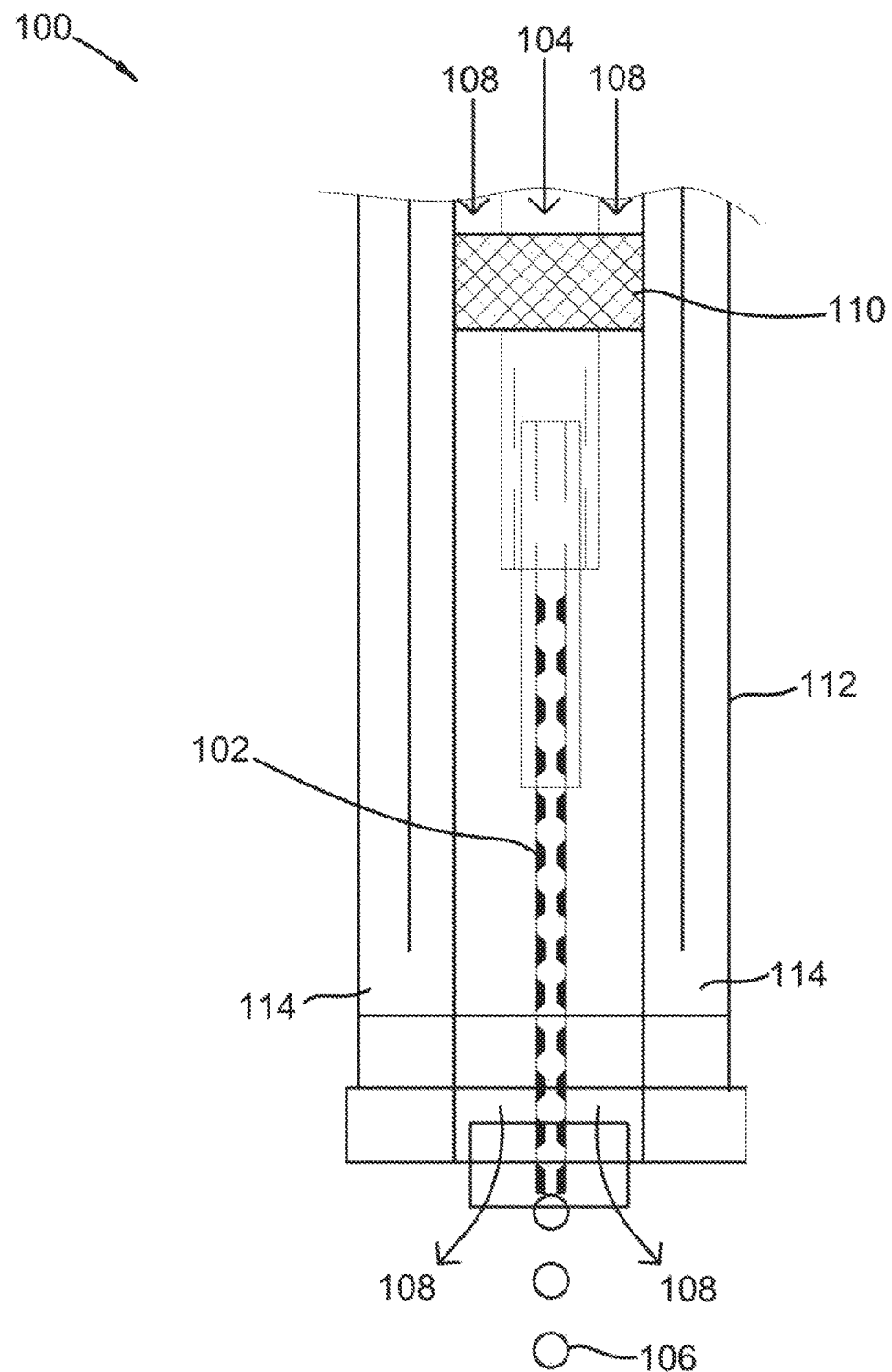
FIG. 1 shows a droplet generator for production of droplets using a capillary tube and an axial gas flow as per the Prior Art.

Referring to FIG. 1, a droplet generator for production of droplets using a capillary tube and an axial gas flow is shown at 100, as per the Prior Art. Capillary tube 102 is provided with liquid 104, liquid 104 forming droplets 106 at the tip of capillary tube 102. Capillary tube 102 is situated in the center of axial gas chamber 110. Axial gas 108 is provided to axial gas chamber 110, axial gas 108 leaving axial gas chamber 110 and passing across the tip of capillary tube 102 and assisting in pulling droplet 106 off of the tip of capillary tube 102. As this prior art was used to feed a combustion chamber, cooling jacket 112 with coolant steam 114 was provided to keep temperatures lower for capillary tube 102 and axial gas chamber 110. In contrast, the present invention does not require a capillary tube for droplet formation or a cooling jacket.

Figure 2:
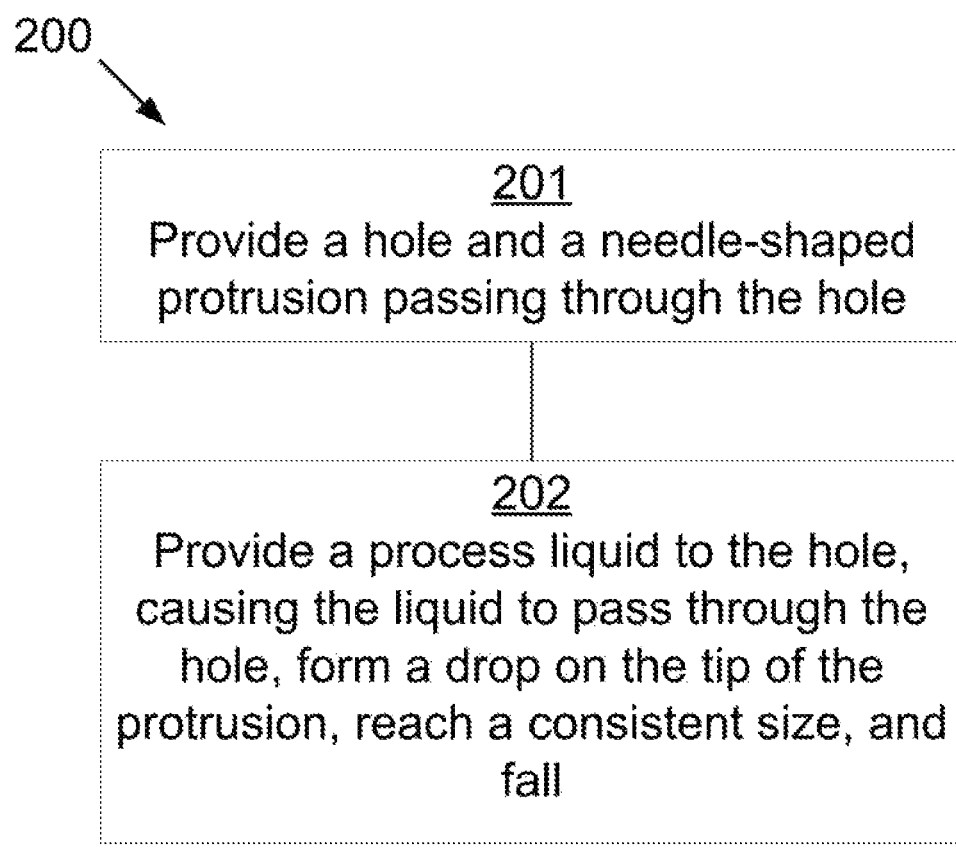
FIG. 2 shows a method for forming substantially consistently-sized and substantially controllably-timed droplets.

Referring to FIG. 2, a method for forming substantially consistently-sized and substantially controllably-timed droplets is shown at 200, as per one embodiment of the present invention. An opening is provided with a protrusion passing through the opening, the protrusion ending at a tip below the opening 201. A process liquid is provided to the opening at a controlled flow rate, causing the process liquid to pass through the opening and flow along the protrusion, forming a droplet of the process liquid on the tip that reaches a consistent droplet size and falls 202. The process liquid continues to pass through the opening at an even time interval based on the flow rate, repeating steps 201 and 202. In this manner, consistently-sized and substantially controllably-timed droplets are formed.

Figure 3:
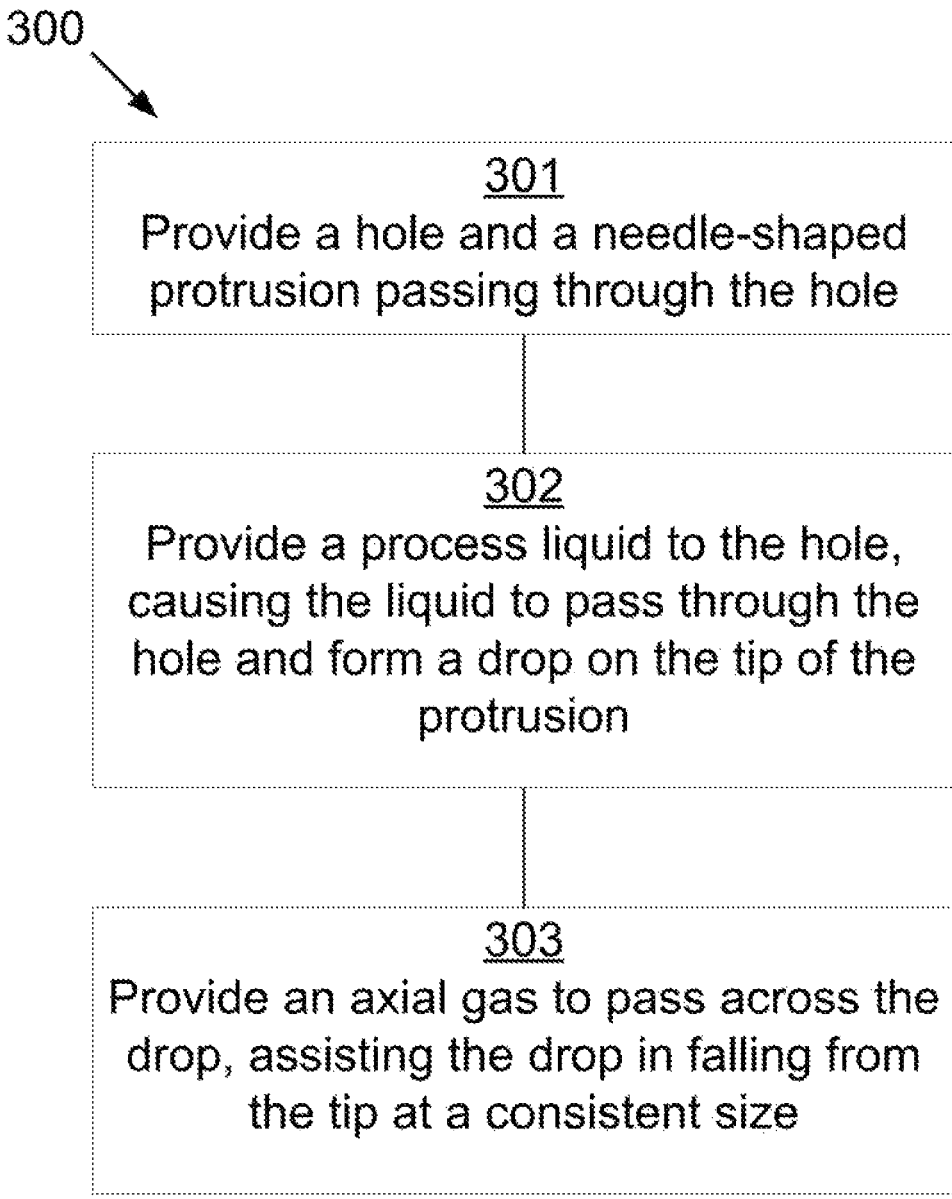
FIG. 3 shows a method for forming substantially consistently-sized and substantially controllably-timed droplets.

Referring to FIG. 3, a method for forming substantially consistently-sized and substantially controllably-timed droplets is shown at 300, as per one embodiment of the present invention. An opening is provided with a protrusion passing through the opening, the protrusion ending at a tip below the opening 301. A process liquid is provided to the opening at a controlled flow rate, causing the process liquid to pass through the opening and flow along the protrusion, forming a droplet of the process liquid on the tip 302. The opening is axially oriented inside a tube, the tube extending below a bottom portion of the opening and above the tip of the protrusion, the tube providing a gas flowing axially downward past the droplet to draw the droplet off the protrusion at a consistent droplet size 303. The process liquid continues to pass through the opening at an even time interval based on the flow rate, repeating steps 301, 302, and 303. In this manner, consistently-sized and substantially controllably-timed droplets are formed.

Figure 4A:
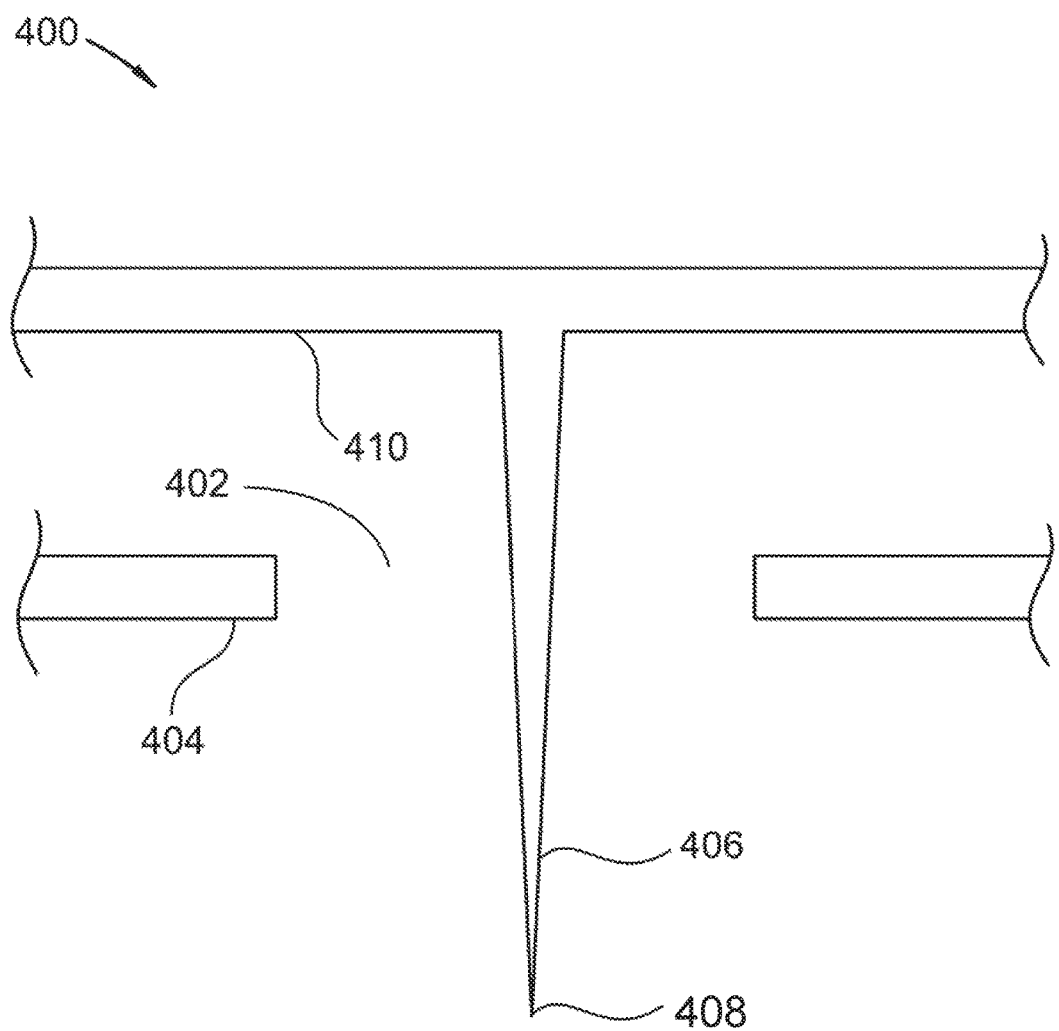
FIGS. 4A-B shows a cross-sectional view of a device for forming substantially consistently-sized and substantially controllably-timed droplets.
Figure 4B:
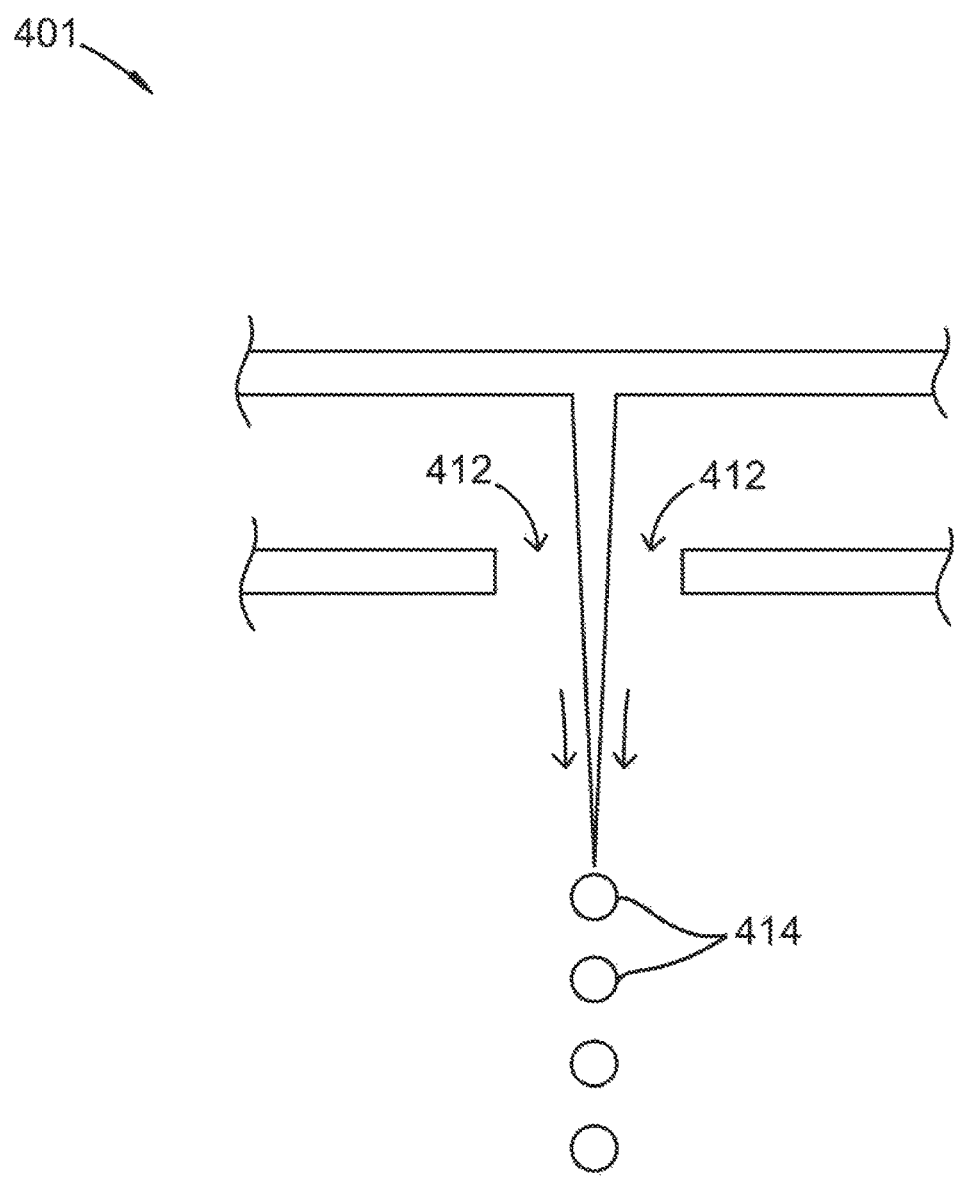

Referring to FIGS. 4A-B, a cross-sectional view of a device for forming substantially consistently-sized and substantially controllably-timed droplets is shown at 400 and 401, as per one embodiment of the present invention. Opening 402 goes through lower plate 404. Protrusion 406 passes through opening 402, ending at tip 408. Protrusion 406 is mounted on upper plate 410. Process liquid 412 is passed across lower plate 404 and into to opening 402. Process liquid 412 flows along protrusion 406 and forms droplet 414 at tip 408. Drop 414 reaches a consistent droplet size and falls. Due to the nature of droplet behavior at tips of protrusions, droplet 414 will fall at the same size each time. By keeping the flow rate of process liquid 412 consistent, droplet 414 will fall at an even time interval. In this manner, consistently-sized and substantially controllably-timed droplets are formed.

Figure 5A:
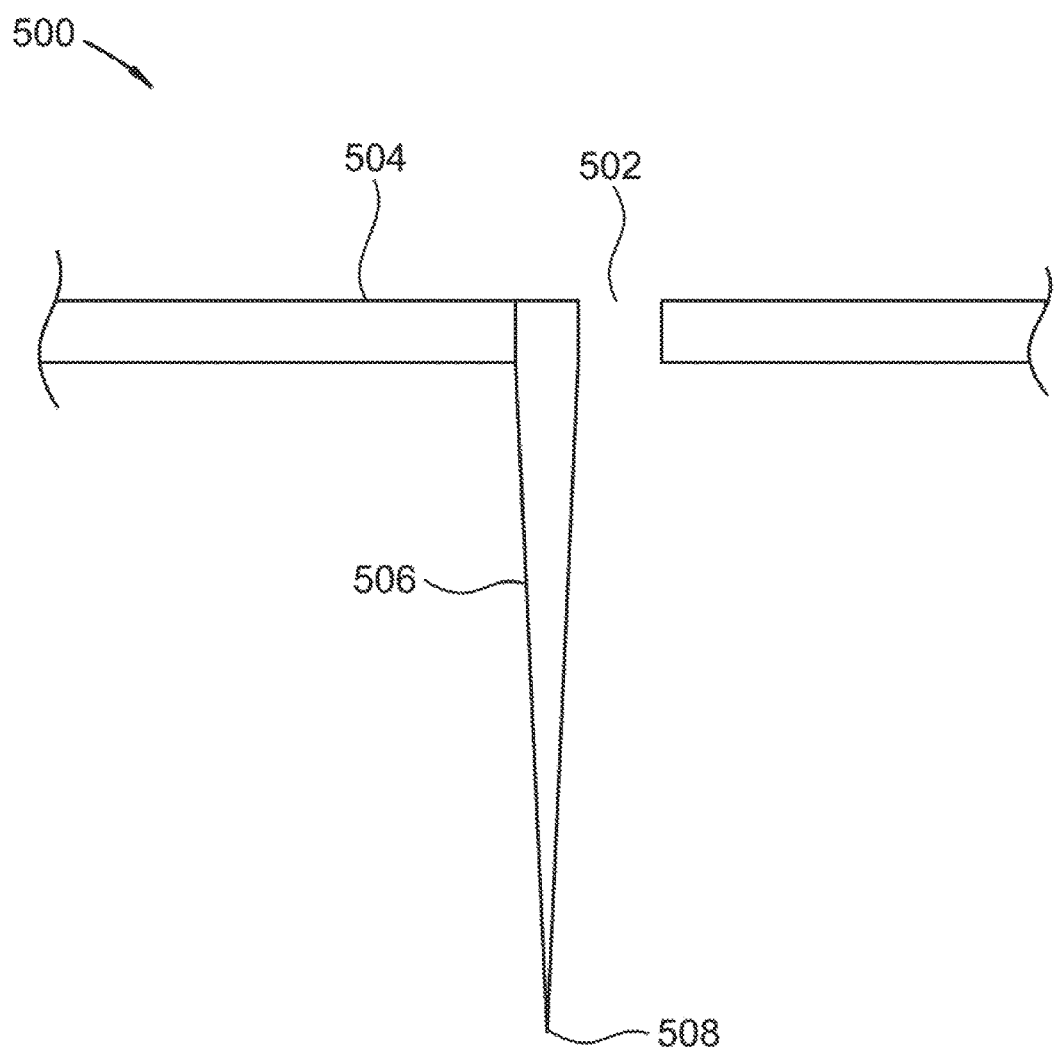
FIGS. 5A-B shows a cross-sectional view of a device for forming substantially consistently-sized and substantially controllably-timed droplets.
Figure 5B:
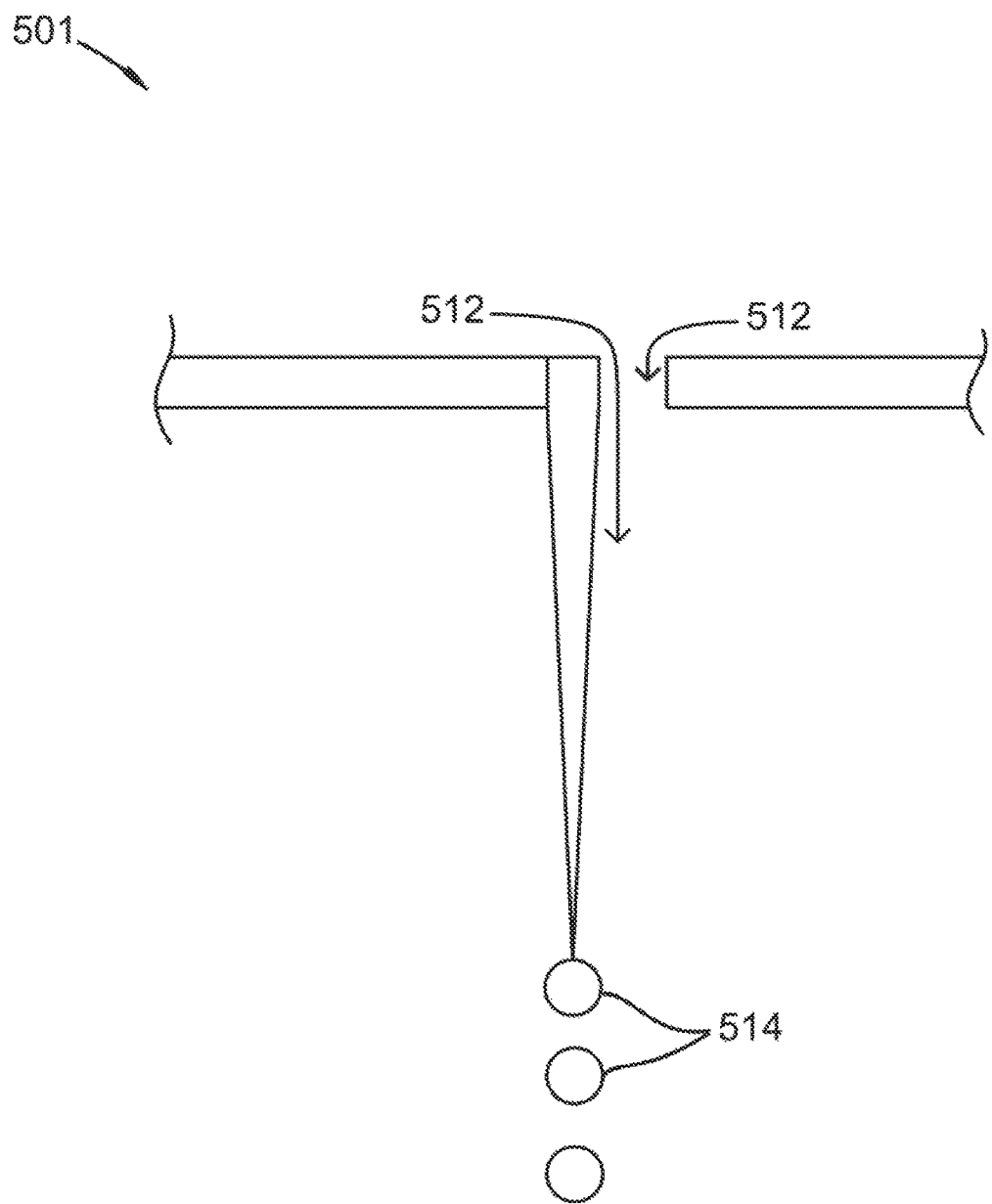

Referring to FIGS. 5A-B, a device for forming substantially consistently-sized and substantially controllably-timed droplets is shown at 500 and 501, as per one embodiment of the present invention. Opening 502 goes through plate 504. Protrusion 506 passes through opening 502, ending at tip 508. Protrusion 506 is mounted on the edge of opening 502. Process liquid 512 is passed across lower plate 504 and into to opening 502. Process liquid 512 flows along protrusion 506 and forms droplet 514 at tip 508. Drop 514 reaches a consistent droplet size and falls. Due to the nature of droplet behavior at tips of protrusions, droplet 514 will fall at the same size each time. By keeping the flow rate of process liquid 512 consistent, droplet 514 will fall at an even time interval. In this manner, consistently-sized and substantially controllably-timed droplets are formed. In some embodiments, a plurality of protrusions 506 are mounted around the perimeter of opening 502.

Figure 6A:
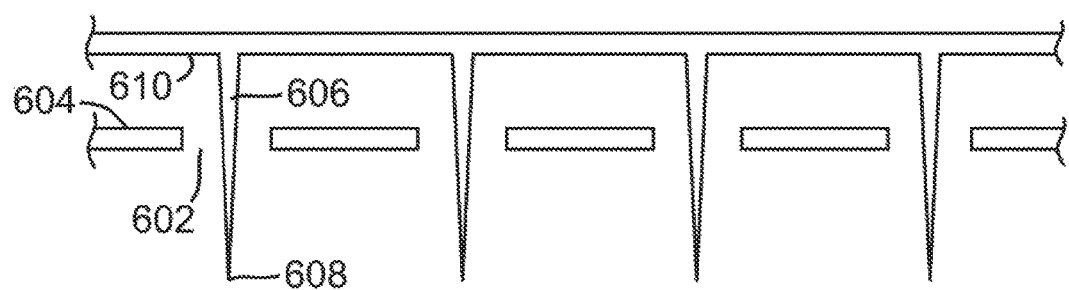

Referring to FIGS. 6A-B, cross-sectional and isometric cutaway views of a device for forming a shower of consistently-sized and substantially controllably-timed droplets is shown at 600 and 601, respectively, as per one embodiment of the present invention. Openings 602 go through lower plate 604. Protrusion 606 passes through opening 602, ending at tip 608. protrusion 606 is mounted on upper plate 610. Process liquid 612 is passed across lower plate 604 and into to opening 602. Process liquid 612 flows along protrusion 606 and forms droplet 614 at tip 608. Drop 614 reaches a consistent droplet size and falls. Due to the nature of droplet behavior at tips of protrusions, droplet 614 will fall at nearly the same size for a given material under a given set of operating conditions. By keeping the flow rate of process liquid 612 consistent, droplet 614 will fall at an even, controllable time interval. In this manner, a shower of consistently-sized and substantially controllably-timed droplets are formed.

Figure 7A:
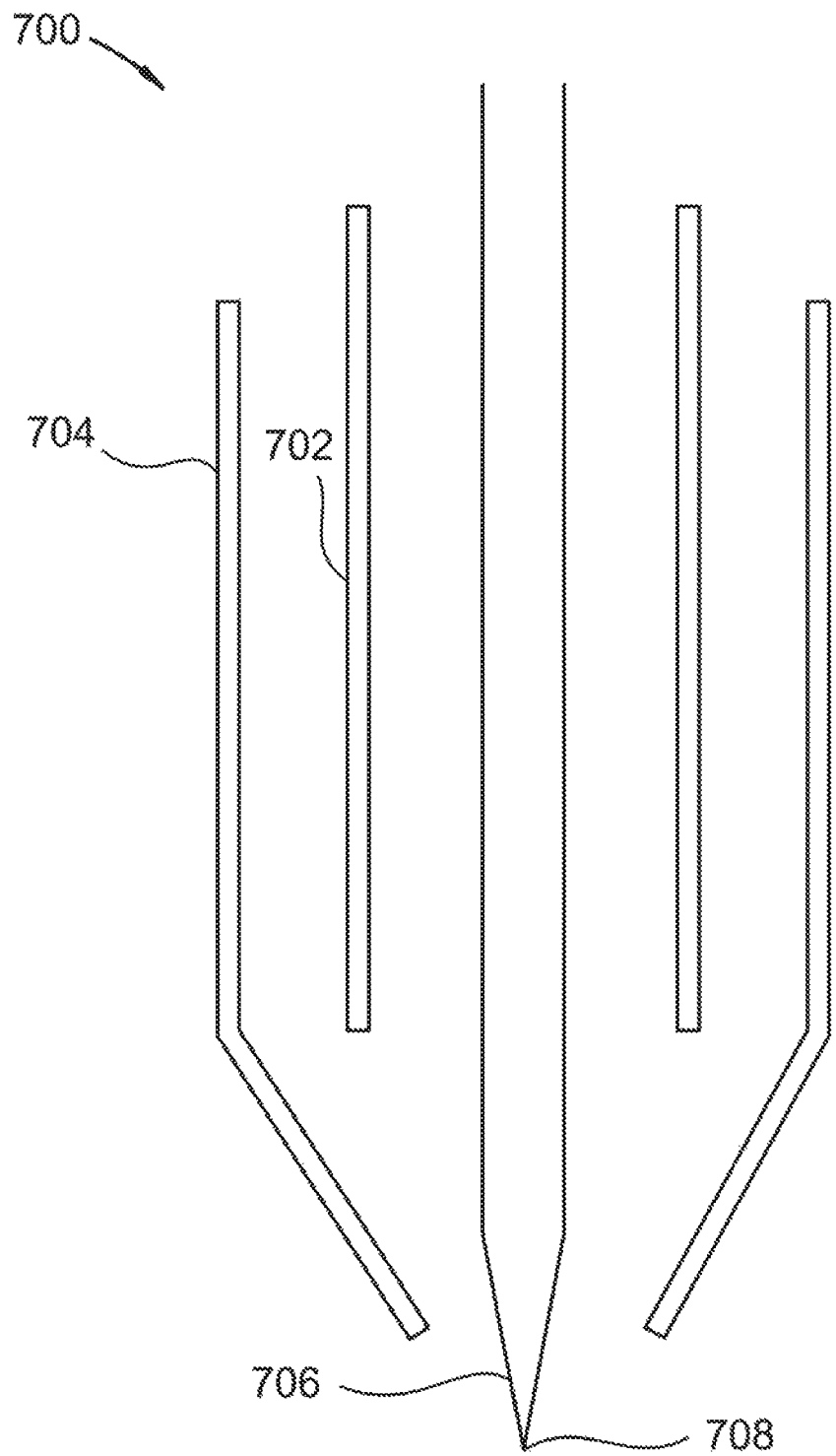
FIGS. 7A-B shows a cross-sectional view and an isometric cutaway view of a device for forming substantially consistently-sized and substantially controllably-timed droplets.
Figure 7B:
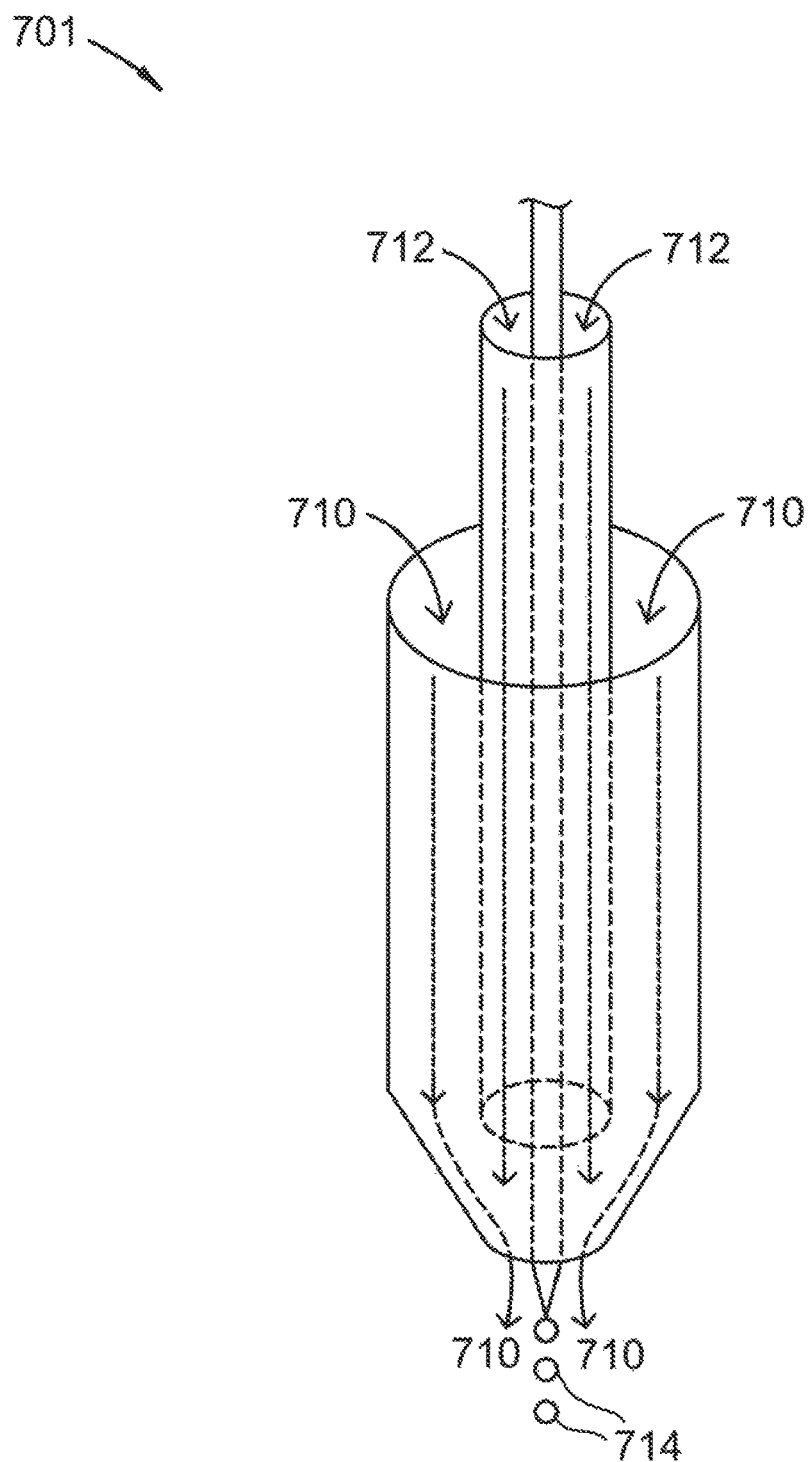

Referring to FIGS. 7A-B, cross-sectional and isometric cutaway views of a device for forming substantially consistently-sized and substantially controllably-timed droplets is shown at 700 and 701, respectively, as per one embodiment of the present invention. An opening, liquid tube 702, carries process liquid 712 down from an upper chamber. Protrusion 706 passes through liquid tube 702, ending at tip 708. Protrusion 706 is mounted on an upper plate (not shown). Liquid tube 702 is axially oriented in axial gas tube 704, axial gas tube extending below a bottom portion of liquid tube 702 and above tip 708. Process liquid 712 is passed into liquid tube 702. Process liquid 712 flows along protrusion 706 and forms droplet 714 at tip 708. Axial gas 710 flows axially downward past droplet 714, which causes droplet 714 to reach a consistent droplet size and fall. Due to the nature of droplet behavior at tips of protrusions, droplet 714, with axial gas 710 flowing past, will fall at the same size each time. By keeping the flow rates of process liquid 712 and axial gas 710 consistent, droplet 714 will fall at an even time interval. In this manner, consistently-sized and substantially controllably-timed droplets are formed. Axial gas 710 causes droplet 714 to fall at a smaller size than would occur without axial gas, as it assists in pulling droplet 714 free of tip 708.

Figure 8A:
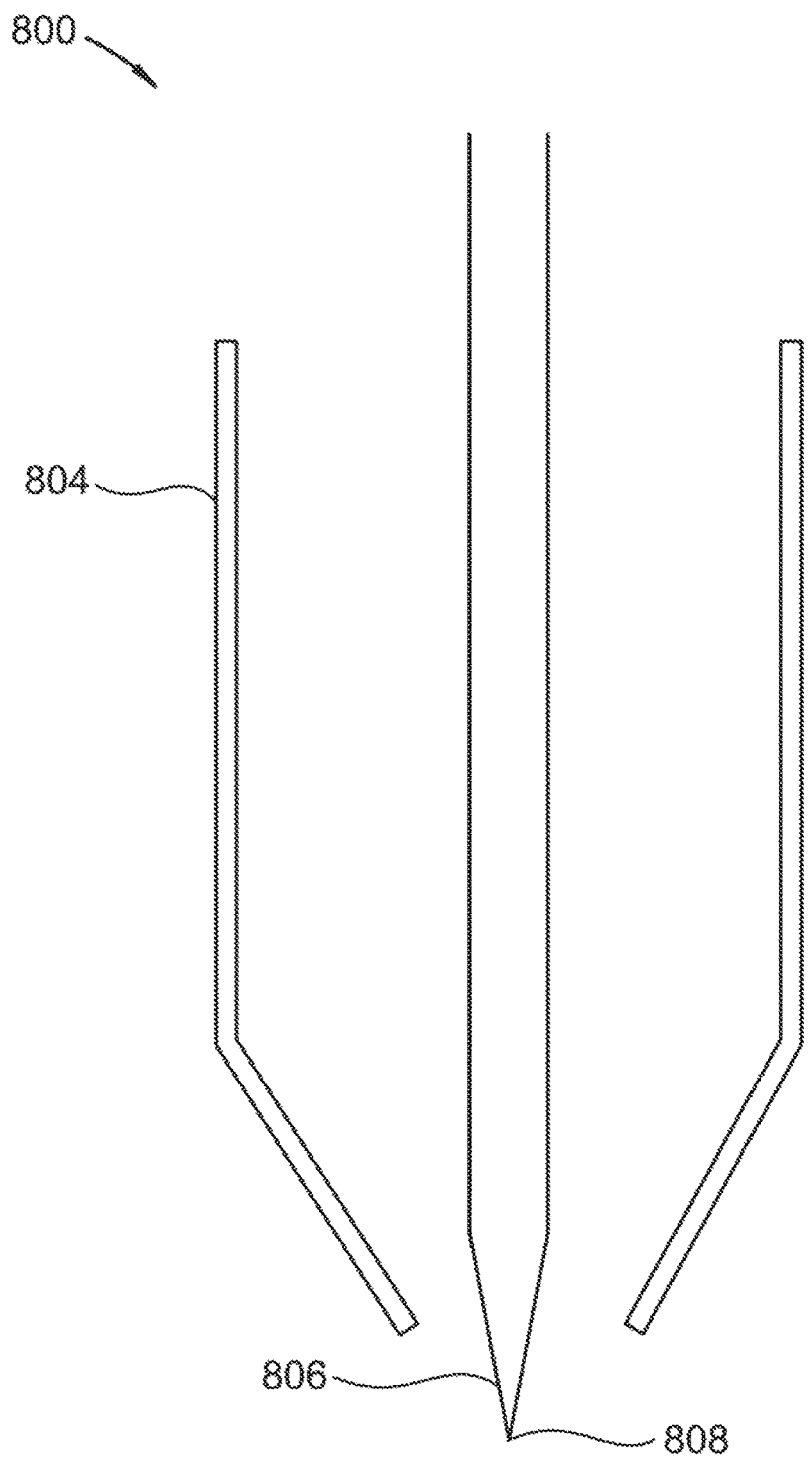
FIGS. 8A-B shows a cross-sectional view and an isometric cutaway view of a device for forming substantially consistently-sized and substantially controllably-timed droplets.
Figure 8B:
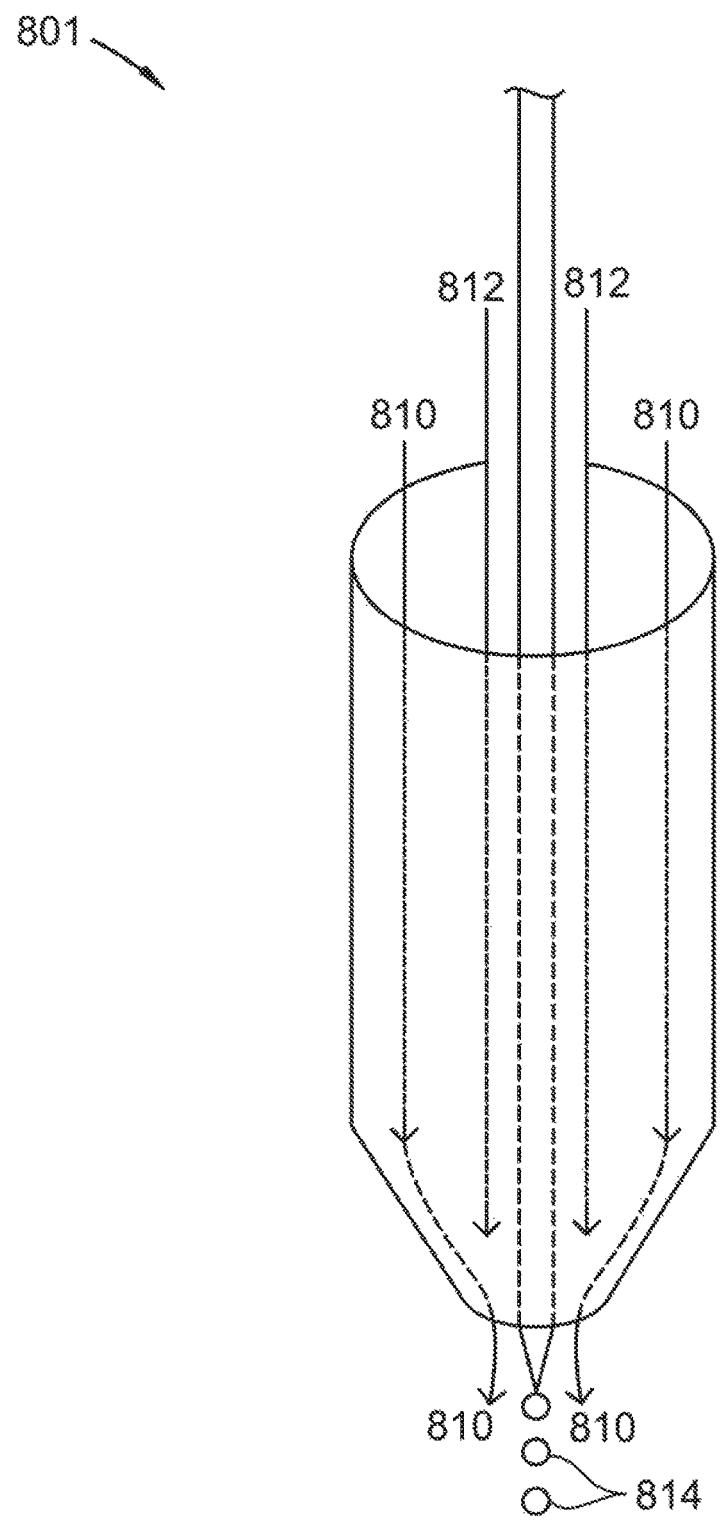

Referring to FIGS. 8A-B, cross-sectional and isometric cutaway views of a device for forming substantially consistently-sized and substantially controllably-timed droplets is shown at 800 and 801, respectively, as per one embodiment of the present invention. An opening, not shown, carries process liquid 812 down from an upper chamber. protrusion 806 passes through the opening, ending at tip 808. protrusion 806 is mounted on an upper plate (not shown). Protrusion 806 is axially oriented in axial gas tube 804, axial gas tube ending above tip 808. Process liquid 812 is passed through the opening and along protrusion 806 and forms droplet 814 at tip 808. Axial gas 810 flows axially downward past droplet 814, which causes droplet 814 to reach a consistent droplet size and fall. Due to the nature of droplet behavior at tips of protrusions, droplet 814, with axial gas 810 flowing past, will fall at the same size each time. By keeping the flow rates of process liquid 812 and axial gas 810 consistent, droplet 814 will fall at an even time interval. In this manner, consistently-sized and substantially controllably-timed droplets are formed. Axial gas 810 causes droplet 814 to fall at a smaller size than would occur without axial gas, as it assists in pulling droplet 814 free of tip 808.

The present invention eliminates or minimizes the formation of secondary or satellite droplets. It forms droplets much more uniformly sized that the traditional spray nozzles and atomizers that break up sheets or streams of materials aerodynamically or through thinning or stretching them. In all embodiments, the term "consistently-sized droplets" refers to this elimination or minimization of the formation of secondary or satellite droplets.

In all embodiments, the term "controllably-timed droplets" refers to production of droplets at a rate that is controllable over a broad range without substantially changing the droplet size or distribution. By changing the flow rate of process liquid, the rate of production of droplets is changed. In this manner, controllably-timed droplets are produced at consistent sizes.

In some embodiments, the protrusion comprises a surface material optimized for the flow of the process liquid. In some embodiments, the surface material comprises ceramics, polytetrafluoroethylene, polychlorotrifluoroethylene, stainless steel, aluminum, or combinations thereof. In some embodiments, the protrusion is optimized to produce prescribed sizes of droplets.

In some embodiments, the method or the device is used for forming droplets in a system comprising spray towers, contacting towers, heat exchangers, drying towers, absorption towers, combustors, prilling towers, and combinations thereof.

In some embodiments, the tip of the protrusion comprises a diameter smaller than the substantially consistent droplet size.

In some embodiments, the droplet size ranges from 1 μm to 5 cm. In some embodiments, the opening comprises a diameter of 5 μm to 10 cm. In some embodiments, the droplets are produced at a frequency from 100 Hz to ⅟60 Hz. In some embodiments, the liquid comprises a viscosity of 0.1 cP to 10,000 cP. In some embodiments, the tip of the protrusion comprises a diameter of 0.5 μm to 4 cm.

In some embodiments, the axial gas flow velocity ranges from 0.1 m/s to 100 m/s.

In some embodiments, the axial gas comprises air, nitrogen, oxygen, carbon dioxide, argon, helium, hydrogen, and light hydrocarbons.

In some embodiments, the process liquid comprises water, brine, hydrocarbons, liquid ammonia, liquid carbon dioxide, other cryogenic liquids, other hydrocarbons, and combinations thereof. In some embodiments, the cryogenic liquid comprises 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In some embodiments, the chamber or vessel into which the droplets are being dropped contains a gas or vapor that the droplets interact with by mass exchange, heat exchange, or a combination thereof. The consistently-sized and substantially controllably-timed droplets interact effectively with the gas or vapor. In some embodiments, the gas or vapor comprises combustion flue gas, syngas, producer gas, natural gas, steam reforming gas, any hydrocarbon that has a lower freezing point than the temperature of the droplets, light gases, refinery off-gases, or combinations thereof. In some embodiments, the gas or vapor comprises foulants including carbon dioxide, nitrogen oxide, sulfur dioxide, nitrogen dioxide, sulfur trioxide, hydrogen sulfide, hydrogen cyanide, water, hydrocarbons with a higher freezing point than the temperature of the droplets, or combinations thereof. The foulants can foul or damage heat or mass exchangers, and so using the method of the present invention can eliminate those issues.

In some embodiments, the process liquid comprises an entrained solid. The solid comprises minerals, soot, biomass, frozen mercury, salts, water ice, hydrocarbons with a freezing point above a temperature of the liquid, solid particles, frozen condensed gases, or combinations thereof, wherein frozen condensed gases comprise carbon dioxide, nitrogen oxide, sulfur dioxide, nitrogen dioxide, sulfur trioxide, hydrogen sulfide, hydrogen cyanide, or combinations thereof. In some embodiments, the liquid comprises any compound or mixture of compounds with a freezing point above a temperature at which the contact vapor or contact gas solidifies.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

The invention claimed is:

1. A method for forming substantially consistently-sized and substantially controllably-timed droplets comprising:
   providing an opening with a conical protrusion passing through the opening, the conical protrusion ending at a tip below the opening, wherein:
   a process liquid is provided to the opening at a controlled flow rate;
   the process liquid, passing through the opening and flowing along the conical protrusion, forms droplets of the process liquid on the tip that reaches a substantially consistent droplet size and fall; and,
   the process liquid continues to pass through the opening at an even time interval based on the flow rate;
   whereby the droplets are substantially consistently-sized and substantially controllably-timed.

2. The method of claim 1, providing a plate above the opening, wherein the conical protrusion is attached to the plate.

3. The method of claim 1, further comprising attaching the conical protrusion to an interior side of the opening.

4. The method of claim 1, forming the droplets in a system comprising spray towers, absorption towers, combustors, prilling towers, or combinations thereof.

5. The method of claim 4, providing the process liquid to the combustor, the process liquid comprising a fuel.

6. The method of claim 4, further comprising providing a contact gas or a contact vapor to the system and causing the droplets to interact with the contact gas or the contact vapor by mass exchange, heat exchange, or a combination thereof.

7. The method of claim 6, providing the contact gas or the contact vapor comprising combustion flue gas, syngas, producer gas, natural gas, steam reforming gas, any hydrocarbon that has a lower freezing point than the temperature of the droplets, light gases, refinery off-gases, or combinations thereof.

8. The method of claim 7, providing the contact gas or the contact vapor further comprising carbon dioxide, nitrogen oxide, sulfur dioxide, nitrogen dioxide, sulfur trioxide, hydrogen sulfide, hydrogen cyanide, water, hydrocarbons with a higher freezing point than the temperature of the droplets, or combinations thereof.

9. The method of claim 8, providing the process liquid comprising any compound or mixture of compounds with a freezing point above a temperature at which a component of the contact gas or a component of the contact vapor solidifies.

10. The method of claim 1, providing the conical protrusion with a surface material inhibiting an adsorption of gases, preventing a deposition of solids, or combinations thereof.

11. The method of claim 1, providing the tip of the conical protrusion with a diameter smaller than the substantially consistent droplet size.

12. The method of claim 1, further comprising providing a tube, wherein the opening is axially oriented inside the tube, the tube extending below a bottom portion of the opening and above the tip of the conical protrusion, the tube providing a gas flowing axially downward past the droplets to draw the droplets off the conical protrusion.

13. The method of claim 12, forming the droplets in a system comprising spray towers, absorption towers, combustors, prilling towers, or combinations thereof.

14. The method of claim 13, providing the process liquid to the combustor, the process liquid comprising a fuel.

15. The method of claim 13, further comprising providing a contact gas or a contact vapor to the system and causing the droplets to interact with the contact gas or the contact vapor by mass exchange, heat exchange, or a combination thereof.

16. The method of claim 15, providing the contact gas or the contact vapor comprising combustion flue gas, syngas, producer gas, natural gas, steam reforming gas, any hydrocarbon that has a lower freezing point than the temperature of the droplets, light gases, refinery off-gases, or combinations thereof.

17. The method of claim 16, providing the contact gas or the contact vapor further comprising carbon dioxide, nitrogen oxide, sulfur dioxide, nitrogen dioxide, sulfur trioxide, hydrogen sulfide, hydrogen cyanide, water, hydrocarbons with a higher freezing point than the temperature of the droplets, or combinations thereof.

18. The method of claim 17, providing the process liquid comprising any compound or mixture of compounds with a freezing point above a temperature at which a component of the contact gas or a component of the contact vapor solidifies.

19. The method of claim 12, providing the conical protrusion with a surface material inhibiting an adsorption of gases, preventing a deposition of solids, or combinations thereof.

20. The method of claim 12, providing the tip of the conical protrusion with a diameter smaller than the substantially consistent droplet size.

* * * * *